United States Patent
Kumar et al.

(10) Patent No.: US 11,614,010 B2
(45) Date of Patent: Mar. 28, 2023

(54) PANEL ASSEMBLY AND AFTERTREATMENT ASSEMBLY INCLUDING PANEL ASSEMBLIES

(71) Applicant: Caterpillar Inc., Peoria, IL (US)

(72) Inventors: Samuel S. Kumar, Dunlap, IL (US); Courtney E. Strauser, Washington, IL (US); Scott M. Peters, Edwards, IL (US); Theron J. Cassidy, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 394 days.

(21) Appl. No.: 17/009,125

(22) Filed: Sep. 1, 2020

(65) Prior Publication Data
US 2022/0065145 A1    Mar. 3, 2022

(51) Int. Cl.
*F01N 1/08*    (2006.01)
*F01N 13/08*   (2010.01)

(52) U.S. Cl.
CPC ........... *F01N 1/088* (2013.01); *F01N 13/082* (2013.01); *F01N 2240/20* (2013.01)

(58) Field of Classification Search
CPC ............. F01N 13/0097; F01N 13/1872; F01N 13/1888; F01N 2450/30; F01N 3/2839; F01N 2450/02
See application file for complete search history.

(56) References Cited

U.S. PATENT DOCUMENTS

| | | | |
|---|---|---|---|
| 4,294,330 A * | 10/1981 | Baldwin | F01N 1/02 181/275 |
| 6,168,689 B1 * | 1/2001 | Park | B03C 3/38 422/186.04 |
| 6,629,614 B2 | 10/2003 | Jordan | |
| 7,249,653 B2 | 7/2007 | Sheng et al. | |
| 7,270,366 B2 | 9/2007 | Kamura et al. | |
| 10,480,387 B2 | 11/2019 | Denis et al. | |

(Continued)

FOREIGN PATENT DOCUMENTS

| | | |
|---|---|---|
| CN | 106640308 | 5/2017 |
| JP | 2007262927 | 10/2007 |

(Continued)

OTHER PUBLICATIONS

Written Opinion and International Search Report for Int'l. Patent Appln. No. PCT/US2021/047045, dated Feb. 18, 2022 (14 pgs).

*Primary Examiner* — Anthony Ayala Delgado

(57) ABSTRACT

A panel assembly includes a panel member, a frame member, and at least one first bar member, and at least one second bar member. The at least one first bar member and the at least one second bar member divide the panel member into a plurality of first areas defining a first height and a first width. The panel assembly also includes a plurality of support arrangements for dividing each first area into a plurality of second areas. Each support arrangement includes a first support member defining a first length such that the first width defined by the first area is greater than the first length. Each support arrangement also includes a second support member defining a second length such that the first height defined by the first area is greater than the second length.

20 Claims, 10 Drawing Sheets

(56) References Cited

U.S. PATENT DOCUMENTS

| | | | | |
|---|---|---|---|---|
| 2014/0154159 A1* | 6/2014 | Rao | ............... | F01N 13/0097 |
| | | | | 423/212 |
| 2016/0348558 A1* | 12/2016 | Garduno | ............ | F01N 3/2066 |
| 2018/0223719 A1* | 8/2018 | Denis | ............ | F01N 13/1838 |
| 2019/0178139 A1* | 6/2019 | Chenoweth | ......... | F01N 13/017 |

FOREIGN PATENT DOCUMENTS

| | | | |
|---|---|---|---|
| JP | 2008062143 A | 3/2008 |
| WO | 2010118845 A1 | 10/2010 |

* cited by examiner

PANEL ASSEMBLY AND AFTERTREATMENT ASSEMBLY INCLUDING PANEL ASSEMBLIES

TECHNICAL FIELD

The present disclosure relates to a panel assembly, and more particularly, an aftertreatment assembly including a plurality of panel assemblies.

BACKGROUND

An aftertreatment system is associated with an engine, such as an internal combustion engine, to reduce and convert particulate matter that may be present in an exhaust gas flow exiting the engine. The aftertreatment system is typically disposed within a housing. The housing includes a number of panel assemblies that are arranged to define a hollow space for receiving the aftertreatment system. The exhaust gas flow may cause exhaust gas pressure pulsations which may vibrate one or more components of the aftertreatment system. Such vibrations may be transferred to the panel assemblies and may cause cracking of the panel assemblies.

In order to prevent or minimize damage to the panel assemblies subjected to the exhaust gas pressure pulsations, it may be desirable for the panel assemblies to have natural frequencies outside the range of the pulsations. Further, conventional panel assemblies that are used with aftertreatment systems are often expensive and/or complex to manufacture and exhibit repeatability constraints in a production environment. Additionally, there is a lack of a panel assembly that can be scaled to meet requirements of configurations and sizes of different aftertreatment systems.

U.S. Pat. No. 4,294,330 describes a muffler for a pneumatic impact device operating at a frequency below or about 60 Hertz. The muffler includes an elastomeric housing adapted to receive and discharge exhaust gas. Further, the elastomeric housing is divided into an admission chamber and a series of muffler chambers. An inlet conduit is communicating with the admission chamber and each muffler chamber. An exhaust conduit is communicating with each muffler chamber as well as with a tail pipe outside the elastomeric housing. A Helmholtz resonator is communicating with the admission chamber.

SUMMARY OF THE DISCLOSURE

In an aspect of the present disclosure, a panel assembly is provided. The panel assembly includes a panel member defining a longitudinal axis. The panel assembly also includes a frame member secured to the panel member. The panel assembly further includes at least one first bar member extending along the longitudinal axis of the panel member, the at least one first bar member being secured to the panel member and the frame member. The panel assembly includes at least one second bar member extending substantially perpendicular to the longitudinal axis of the panel member, the at least one second bar member being secured to the panel member and the frame member. The at least one first bar member and the at least one second bar member divide the panel member into a plurality of first areas defining a first height and a first width. The panel assembly also includes a plurality of support arrangements secured to the panel member. Each of the plurality of first areas receive a corresponding support arrangement of the plurality of support arrangements for dividing the first area into a plurality of second areas. Each support arrangement includes a first support member extending along the longitudinal axis of the panel member. The first support member defines a first length such that the first width defined by the first area is greater than the first length. Each support arrangement also includes a second support member secured to the first support member and extending substantially perpendicular to the first support member. The second support member defines a second length such that the first height defined by the first area is greater than the second length.

In an aspect of the present disclosure, an aftertreatment assembly is provided. The aftertreatment assembly includes an aftertreatment system. The aftertreatment assembly also includes a housing for receiving the aftertreatment system. The housing includes a plurality of panel assemblies arranged to define a hollow space for receiving the aftertreatment system. Each panel assembly includes a panel member defining a longitudinal axis. Each panel assembly also includes a frame member secured to the panel member. Each panel assembly further includes at least one first bar member extending along the longitudinal axis of the panel member, the at least one first bar member being secured to the panel member and the frame member. Each panel assembly includes at least one second bar member extending substantially perpendicular to the longitudinal axis of the panel member, the at least one second bar member being secured to the panel member and the frame member. The at least one first bar member and the at least one second bar member divide the panel member into a plurality of first areas defining a first height and a first width. Each panel assembly also includes a plurality of support arrangements secured to the panel member. Each of the plurality of first areas receive a corresponding support arrangement of the plurality of support arrangements for dividing the first area into a plurality of second areas. Each support arrangement includes a first support member extending along the longitudinal axis of the panel member. The first support member defines a first length such that the first width defined by the first area is greater than the first length. Each support arrangement also includes a second support member secured to the first support member and extending substantially perpendicular to the first support member. The second support member defines a second length such that the first height defined by the first area is greater than the second length.

DETAILED DESCRIPTION

Wherever possible, the same reference numbers will be used throughout the drawings to refer to same or like parts.

Figure 1:
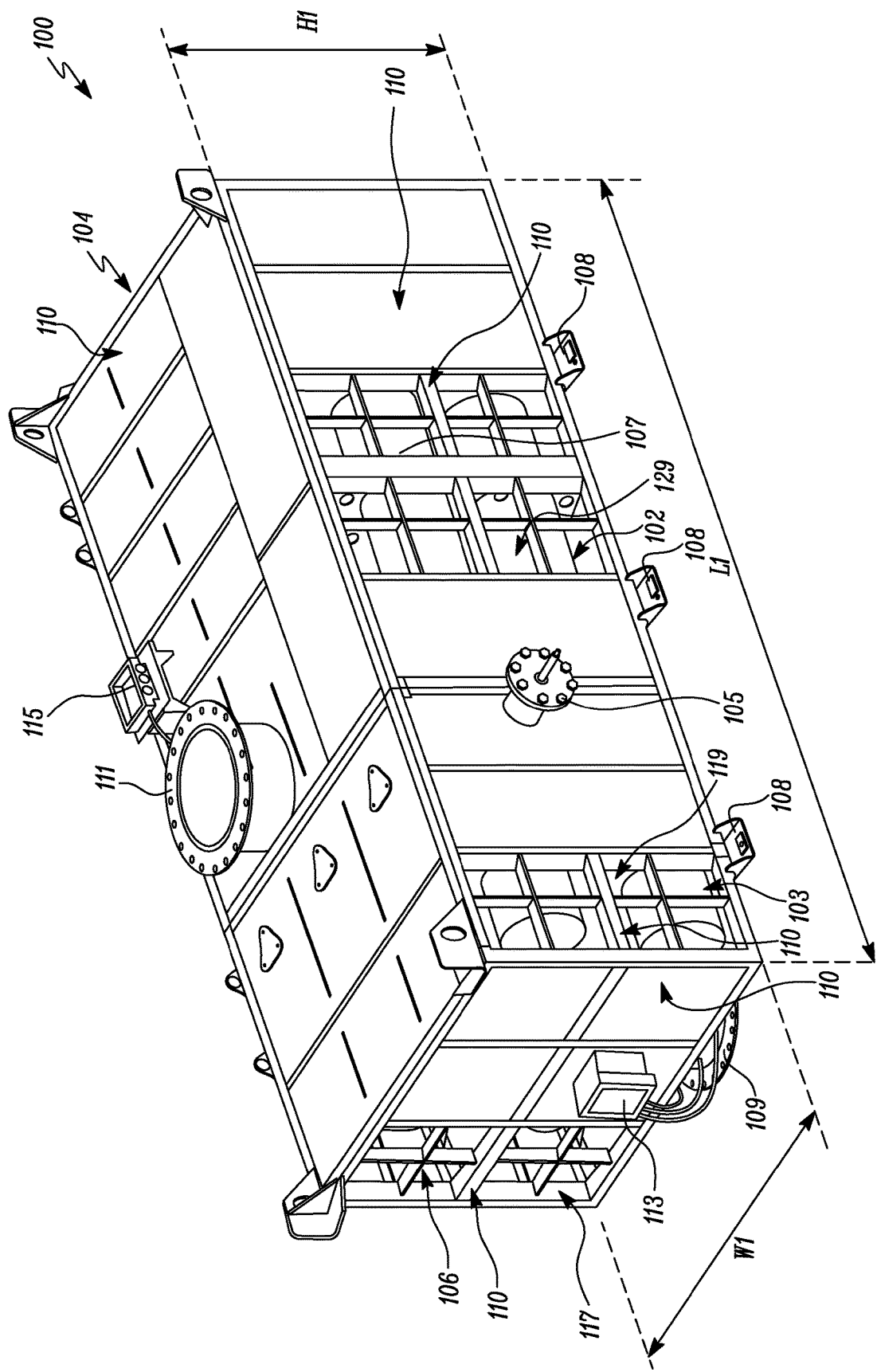
FIG. 1 illustrates a perspective view of an aftertreatment assembly having a housing with certain components removed for purposes of illustration, according to an embodiment of the present disclosure.

FIG. 1 illustrates an exemplary aftertreatment assembly 100. The aftertreatment assembly 100 is positioned at an exhaust side (not shown) of an engine (not shown), such as an internal combustion engine. The aftertreatment assembly 100 may be associated with a mobile machine, such as a construction machine, or a stationary machine, as per application requirements. The aftertreatment assembly 100 includes an aftertreatment system 102. The aftertreatment system 102 treats an exhaust gas flow exiting an exhaust manifold (not shown) of the engine. The exhaust gas flow may contain emission compounds, such as nitrogen oxides (NOx), unburned hydrocarbons, particulate matter, and other such combustion products. The aftertreatment system 102 may trap or convert NOx, unburned hydrocarbons, particulate matter, its combinations, or other combustion products in the exhaust gas flow before the exhaust gas flow is released into atmosphere.

The aftertreatment system 102 may include a number of components, such as a Selective Catalytic Reduction (SCR) module (not shown), a Diesel Oxidation Catalyst (DOC)/a Diesel Particulate Filter (DPF) section 103, a reductant dosing module 105, a mixer tube 107, an inlet pipe 109, an outlet pipe 111, an inlet wiring control box 113, an outlet wiring control box 115, and the like. The DOC/DPF section 103 may include a DOC module and/or a DPF module disposed therein. The inlet pipe 109 allows the exhaust gas flow exiting the engine to be introduced in a component of the aftertreatment system 102. Further, the outlet pipe 111 allows clean air to exit the aftertreatment system 102.

The aftertreatment assembly 100 includes a housing 104 in which the aftertreatment system 102 is disposed. More particularly, the housing 104 defines a hollow space 106 for receiving the aftertreatment system 102. The housing 104 is embodied as a rigid, box shaped structure. The housing 104 includes a number of brackets 108 that may allow attachment of the aftertreatment assembly 100 to a surface (not shown). Further, the housing 104 defines an opening (not shown) for receiving the inlet pipe 109 of the aftertreatment system 102.

The housing 104 defines a housing length "L1". In some examples, the housing length "L1" may approximately lie in a range of 3500 millimeter (mm) to 4000 mm. Further, the housing 104 defines a housing width "W1". The housing width "W1" may approximately lie in a range of 1500 mm to 3000 mm. The housing 104 also defines a housing height "H1". The housing height "H1" may approximately lie in a range of 1000 mm to 2000 mm. It should be noted that the ranges for the housing length "L1", the housing width "W1", and the housing height "H1" provided herein are exemplary in nature and the ranges may vary as per application requirements. Hereinafter, the housing length "L1", the housing width "W1", and the housing height "H1" may be referred to as housing dimensions.

Further, the housing 104 includes a number of panel assemblies 110 arranged to define the hollow space 106 for receiving the aftertreatment system 102. In other words, the number of panel assemblies 110 are arranged to form the housing 104 for receiving the aftertreatment system 102. Some components of the panel assemblies 110 that are disposed at locations 117, 119, 129 have been omitted from FIG. 1 for illustrating the components of the aftertreatment system 102. It should be noted that each panel assembly 110 may have the same dimensions or different dimensions so as to define the housing 104 based on a configuration and a size of the aftertreatment system 102.

Figure 2:
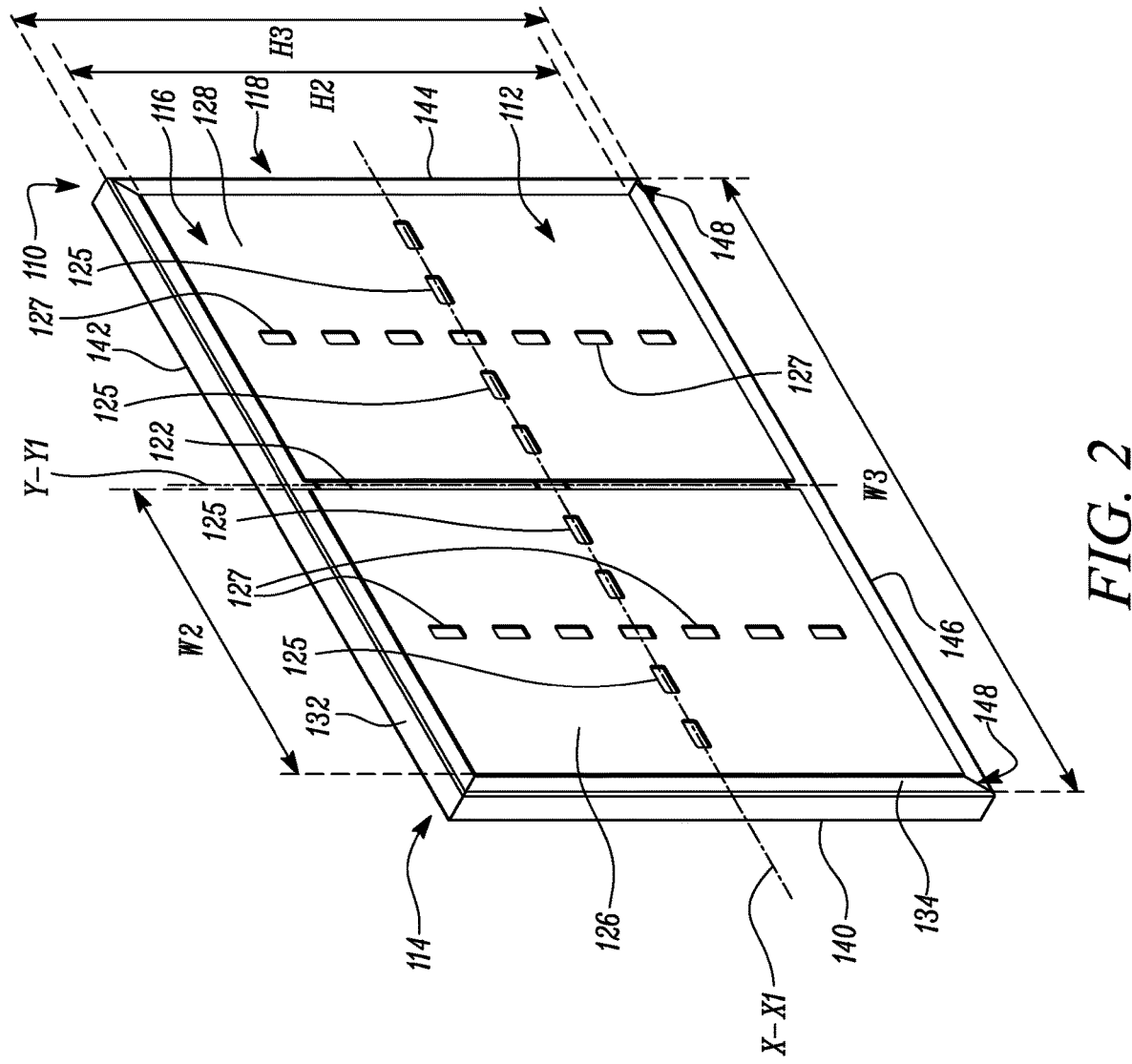
FIG. 2 illustrates a perspective view of a first side of a panel assembly associated with the housing of FIG. 1, according to an embodiment of the present disclosure.

FIG. 2 illustrates a panel assembly 110, according to one embodiment of the present disclosure. In an embodiment, the panel assembly 110 may be made of stainless steel. In other embodiments, other metals or alloys may be used to manufacture the panel assembly 110, without any limitations. The panel assembly 110 defines a first side 112 and a second side 114 that is opposite to the first side 112. The first side 112 faces away from the aftertreatment system 102 and may be referred to as the outside. The second side 114 faces the aftertreatment system 102 and may be referred to as the inside. Further, the panel assembly 110 defines a longitudinal axis "X-X1" and a vertical axis "Y-Y1" that is generally perpendicular to the longitudinal axis "X-X1".

The panel assembly 110 includes a frame member 118, one or more first bar members 120 (shown in FIG. 3), one or more second bar members 121, 122, 123 (shown in FIG. 3), and a number of support arrangements 124 (shown in FIG. 3) that will be explained in detail later in this section. The panel assembly 110 also includes a panel member 116. The panel member 116 includes one or more panels 126, 128. In the illustrated embodiment, the panel member 116 includes the pair of panels 126, 128, namely the first panel 126 and the second panel 128. It should be noted that a total number of the panels 126, 128 may vary as per application requirements. For example, the panel member 116 may include three panels, four panels, six panels, and the like.

Further, the frame member 118, the one or more first bar members 120, the one or more second bar members 121, 122, 123, and the number of support arrangements 124 are secured to the panel member 116 by welding. Details related to welding of various parts of the panel assembly 110 will be described later in this section. Each panel 126, 128 defines a panel width "W2", a panel height "H2", and a panel thickness "T1" (shown in FIG. 5). The panel width "W2" and the panel height "H2" may vary based on the housing dimensions "L1", "W1", "H1" and/or the total number of the panels 126, 128. A maximum value of the panel height "H2" may approximately lie in a range of 1300 mm to 1600 mm. Further, a maximum value of the panel width "W2" may approximately lie in a range of 2400 mm to 2800 mm. Moreover, a maximum value of the panel thickness "T1" may approximately lie in a range of 1.2 mm to 7 mm.

The panel assembly 110 includes the frame member 118 secured to the panel member 116. More particularly, the frame member 118 is secured to each panel 126, 128 along three boundary edges of the corresponding panels 126, 128. In other embodiments, the frame member 118 may be secured to each panel 126, 128 along one boundary edge or two boundary edges of the corresponding panel 126, 128. The frame member 118 is secured to each panel 126, 128 by welding. More particularly, the frame member 118 is secured to each panel 126, 128 by 3 mm to 6 mm fillet welds. The frame member 118 defines an inner surface 130 (shown in FIG. 3), an outer surface 132, a first surface 134, and a second surface 136 (shown in FIG. 3). The boundary edges of the panels 126, 128 are secured to the first surface 134 of the frame member 118. Further, the outer surface 132 of the frame member 118 may be welded to adjacent panel assemblies 110 of the housing 104 (see FIG. 1) for forming the housing 104.

The frame member 118 includes a number of frame sections 140, 142, 144, 146. More particularly, the frame member 118 includes the first frame section 140, the second frame section 142, the third frame section 144, and the fourth frame section 146. The frame sections 140, 142, 144, 146 when secured to each other together define the inner surface 130, the outer surface 132, the first surface 134, and the second surface 136 of the frame member 118. As illustrated, each frame section 140, 142, 144, 146 is substantially perpendicular to an adjacent frame section 140, 142, 144, 146. The frame sections 140, 142, 144, 146 are secured to each other by welding. More particularly, each frame section 140, 142, 144, 146 of the number of frame sections 140, 142, 144, 146 is secured to the adjacent frame section 140, 142, 144, 146 of the number of frame sections 140, 142, 144, 146 by a miter joint 148. Further, the frame sections 140, 142, 144, 146 may be secured to each other by full welding and grinding using 3 mm to 6 mm fillet welds for sealing purposes. In other embodiments, the frame sections 140, 142, 144, 146 may be joined by another type of weld joint that provides efficient sealing. Further, each frame section 140, 142, 144, 146 includes a tubular frame having a substantially square cross-section. Alternatively, each frame section 140, 142, 144, 146 may have a cross-section that is C-shaped, rectangular, or circular, without any limitations.

The frame member 118 defines a height "H3". A maximum value of the height "H3" may approximately lie in a range of 1000 mm to 1600 mm. Further, the frame member 118 defines a width "W3". A maximum value of the width "W3" may approximately lie in a range of 1500 mm to 3000 mm. It should be noted that the height "H3" and the width "W3" of the frame member 118 may vary based on variation in the housing dimensions "L1", "W1", "H1". For example, the height "H3" and the width "W3" of the frame member 118 may increase when additional panels 126, 128 are added to the panel assembly 110 as per desired housing dimensions "L1", "W1", "H1".

Figure 3:
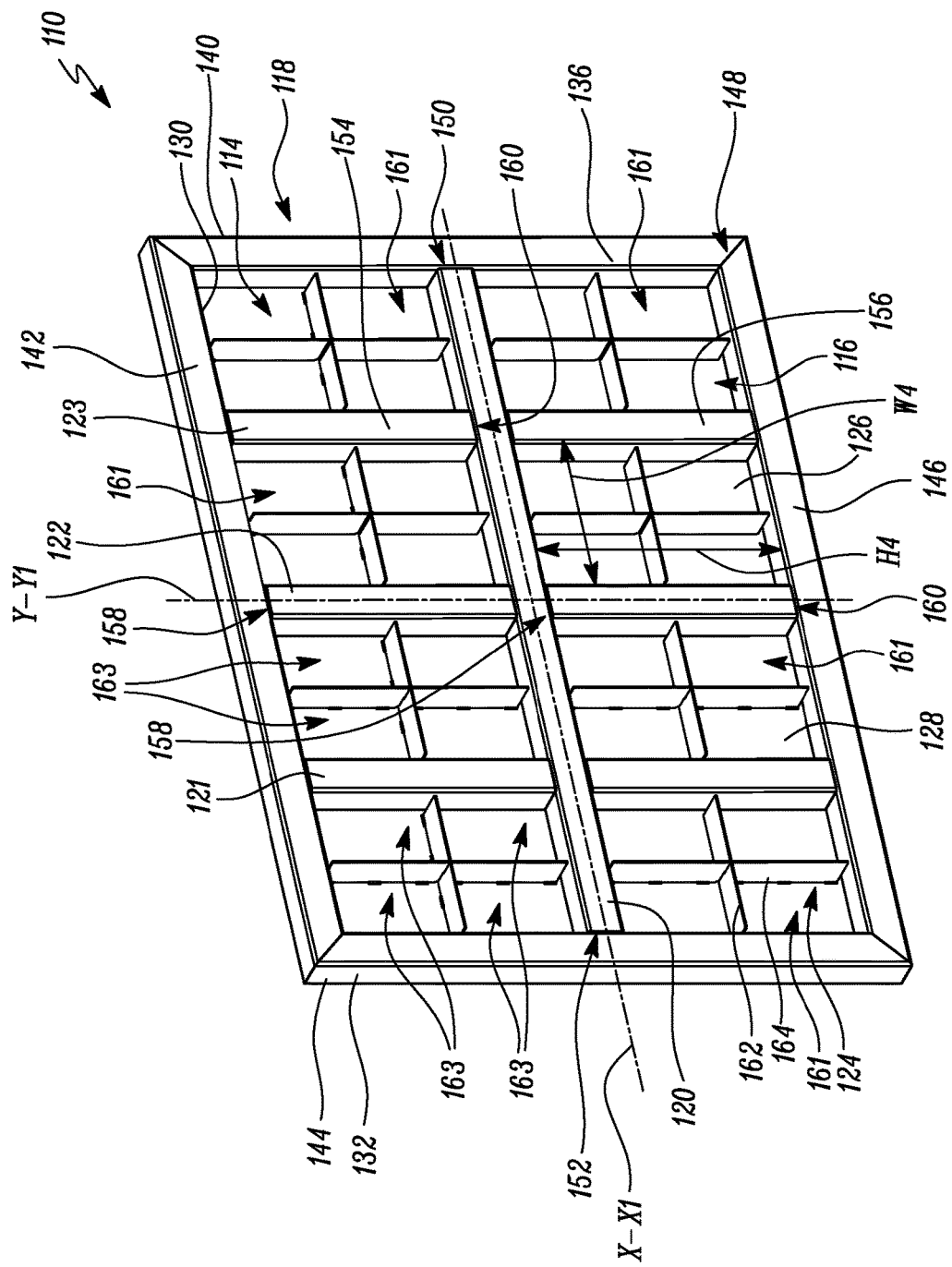
FIG. 3 illustrates a perspective view of a second side of the panel assembly of FIG. 2.

Referring now to FIG. 3, the panel assembly 110 also includes the one or more first bar members 120 extending along the longitudinal axis "X-X1" of the panel assembly 110. The one or more first bar members 120 are embodied as horizontally extending members. In the illustrated embodiment, the panel assembly 110 includes the single first bar member 120. In alternate embodiments, the panel assembly 110 may include two or more first bar members 120 arranged parallel to each other. Further, the first bar member 120 illustrated herein includes a single piece design. Alternatively, the first bar member 120 may include two or more portions disposed adjacent to each other that together define the first bar member 120.

The one or more first bar members 120 are secured to the panel member 116 and the frame member 118. More particularly, the one or more first bar members 120 and the one or more second bar members 121, 122, 123 are secured to the frame member 118 by welding. The first bar member 120 is secured to the first frame section 140 at a first end 150 of the first bar member 120 and to the third frame section 144 at a second end 152 of the first bar member 120 by full welding using 3 mm to 6 mm fillet welds. It should be noted that the first bar member 120 is secured to the inner surface 130 of the frame member 118. Further, the first bar member 120 is secured to the first panel 126 and the second panel 128 by spot welding using 3 mm to 6 mm fillet welds as illustrated by weld marks 125 (shown in FIG. 2).

The panel assembly 110 further includes the one or more second bar members 121, 122, 123 extending substantially perpendicular to the longitudinal axis "X-X1" of the panel assembly 110. The second bar members 121, 122, 123 are embodied as vertically extending members. In one embodiment, the one or more second bar members 121, 122, 123 include two or more second bar members 121, 122, 123. In the illustrated embodiment, the panel assembly 110 includes three second bar members 121, 122, 123. The second bar members 121, 122, 123 are parallel to each other. In alternate embodiments, the panel assembly 110 may include less than three second bar members 121, 122, 123 or more than three second bar members 121, 122, 123, such that the second bar members 121, 122, 123 are arranged parallel to each other. In another embodiment, the second bar members 121, 122, 123 may be disposed at an angle relative to each other. In yet another embodiment, the second bar members 121, 122, 123 may be offset relative to each other. Further, the one or more second bar members 121, 122, 123 define a first portion 154 and a second portion 156. The first and second portions 154, 156 are in alignment with each other and extend along the vertical axis "Y-Y1" to define each second bar member 121, 122, 123. In another example, the first and second portions 154, 156 may be disposed at an angle relative to each other. In yet another example, the first and second portions 154, 156 may be offset relative to each other. Alternatively, the second bar members 121, 122, 123 may include a single piece design.

The one or more second bar members 121, 122, 123 are secured to the panel member 116 and the frame member 118. As illustrated, the first panel 126 is secured to the first frame section 140, a portion of the second frame section 142, a portion of the fourth frame section 146, and the second bar member 122. Further, the second panel 128 is secured to the third frame section 144, a portion of the second frame section 142, a portion of the fourth frame section 146, and the second bar member 122. The second bar members 121, 122, 123 are secured to the panel member 116 by 3 mm to 6 mm fillet welds. More particularly, the second bar member 122 is secured to the first and second panels 126, 128 by full welding using 3 mm to 6 mm fillet welds. Moreover, the second bar member 123 is secured to the first panel 126 and the second bar member 121 is secured to the second panel 128 by spot welding using 3 mm to 6 mm fillet welds as illustrated by weld marks 127 (shown in FIG. 2).

Further, the second bar members 121, 122, 123 are secured to the frame member 118 by full welding and grinding using 3 mm to 6 mm fillet welds for sealing purposes. In the illustrated embodiment, the first portion 154 of each second bar member 121, 122, 123 is secured to the second frame section 142 at a third end 158 of the second portion 156 and to the first bar member 120 at a fourth end 160 of the second portion 156 by full welding using 3 mm to 6 mm fillet welds. Further, the second portion 156 of each second bar member 121, 122, 123 is secured to the first bar member 120 at a third end 158 of the second portion 156 and to the fourth frame section 146 at a fourth end 160 of the second portion 156 by full welding using 3 mm to 6 mm fillet welds. It should be noted that the first portion 154, proximate the third end 158, of each second bar member 121, 122, 123 and the second portion 156, proximate the fourth end 160, of each second bar member 121, 122, 123 are secured to the inner surface 130 of the frame member 118.

Moreover, the second bar members 121, 122, 123 are secured to the first bar member 120 by welding. More particularly, the second bar members 121, 122, 123 may be secured to the first bar member 120 by full welding and grinding with 3 mm to 6 mm fillet welds for sealing purposes. Further, the first bar member 120 and the second bar members 121, 122, 123 include a tubular frame having a substantially square cross-section. Alternatively, the first bar member 120 and the second bar members 121, 122, 123 may have a cross-section that is C-shaped, rectangular, or circular, without any limitations.

It should be noted that, in some cases, the panel assembly 110 may be connected to one or more perpendicularly disposed panel assemblies 110 by a number of structural members (not shown) to form the housing 104 (see FIG. 1). The structural members may embody a gusset. For example, the first bar members 120 of the adjacently disposed panel assemblies 110 may be connected to each other by the structural members. In other examples, the second bar members 121, 122, 123 of the adjacently disposed panel assemblies 110 may be connected to each other by the structural members.

Further, the one or more first bar members 120 and the one or more second bar members 121, 122, 123 divide the panel member 116 into a number of first areas 161 defining a first height "H4" and a first width "W4". Each of the one or more panels 126, 128 includes the one or more first areas 161. In the illustrated embodiment, each of the first panel 126 and the second panel 128 defines four first areas 161. Further, the first bar member 120 and the second bar members 121, 122, 123 divide the panel member 116 into eight first areas 161. More particularly, the panel height "H2" (see FIG. 2) and the panel width "W2" (see FIG. 2) are equally divided to define the first areas 161. Although, the panel member 116 includes eight first areas 161 herein, the panel member 116 may include six first areas 161, ten first areas 161, twelve first areas 161, or any even number of the first areas 161. However, in some embodiments, the panel assembly 110 may include an odd number of the first areas 161 based on the configuration and the size of the aftertreatment system 102.

Figure 4:
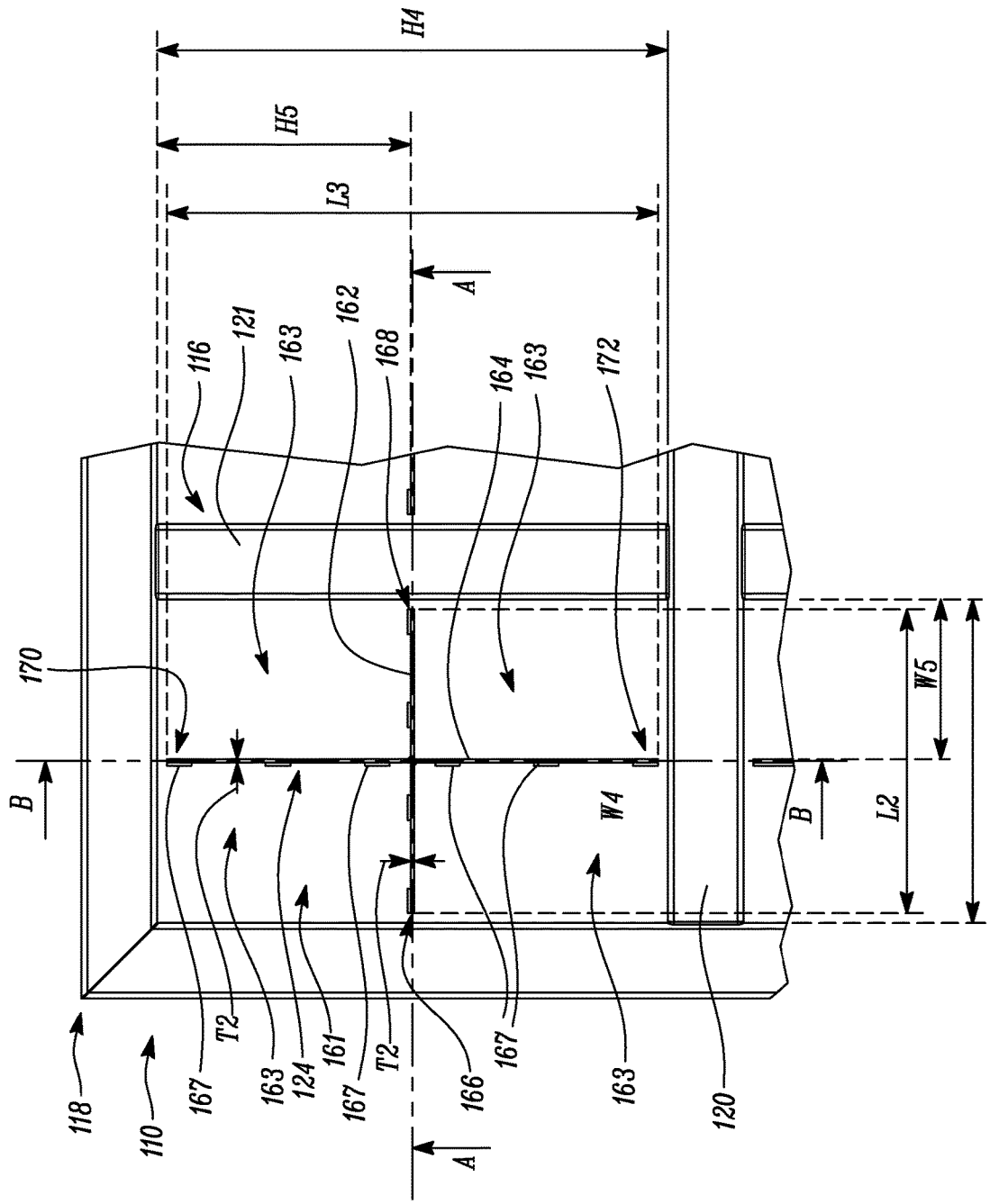
FIG. 4 illustrates an enlarged, fragmented front view of a portion of the panel assembly of FIG. 3.

FIG. 4 illustrates a zoomed-in view of the panel assembly 110 illustrating the first area 161. For explanatory purposes, various details pertaining to the first areas 161 will be explained in relation to a portion of the panel assembly 110 illustrated in FIG. 4. However, the details provided below are equally applicable to the entire panel assembly 110, without any limitations. As illustrated, the first area 161 defines the first height "H4" and the first width "W4". It should be noted that a value of the first height "H4" and a value of the first width "W4" is same for each first area 161, regardless of a total number of the first areas 161. A maximum value of the first height "H4" may approximately lie in a range of 500 mm to 750 mm. Moreover, a maximum value of the first width "W4" may approximately lie in a range of 400 mm to 600 mm. It should be noted that the ranges for the first height "H4" and the first width "W4" is exemplary in nature and dimensions of the first area 161 may vary based on the configuration and the size of the aftertreatment system 102.

The panel assembly 110 further includes a number of support arrangements 124 secured to the panel member 116. Further, the number of support arrangements 124 are not secured to the frame member 118, the one or more first bar members 120, and the one or more second bar members 121, 122, 123 (see FIG. 3). Each of the first areas 161 receive a corresponding support arrangement 124 of the number of support arrangements 124 for dividing the first area 161 into a number of second areas 163. In the illustrated embodiment, each of the one or more second areas 163 includes four second areas 163. In other words, each first area 161 is divided into four second areas 163. Further, the first height "H4" and the first width "W4" are equally divided to define the second areas 163. Although, each first area 161 includes four first areas 161 herein, a total number of the second areas 163 may vary and, in some embodiments, the panel assembly 110 may include additional second areas 163 based on the configuration and the size of the aftertreatment system 102.

Each second area 163 includes a second height "H5" and a second width "W5". In some examples, a maximum value of the second height "H5" may approximately lie in a range of 250 mm to 400 mm, whereas a maximum value of the second width "W5" may approximately lie in a range of 200 mm to 400 mm. It should be noted that the ranges for the second height "H5" and the second width "W5" is exemplary in nature and dimensions of the second area 163 may vary based on the configuration and the size of the aftertreatment system 102.

Each support arrangement 124 includes a first support member 162 extending along the longitudinal axis "X-X1" (see FIGS. 2 and 3) of the panel assembly 110. The first support member 162 is embodied as a rectangular plate herein (see FIG. 3). The first support member 162 defines a first end portion 166 and a second end portion 168. In some examples, the first support member 162 may include rounded or chamfered edges proximate the first and second end portions 166, 168. The first support member 162 defines a first length "L2" such that the first width "W4" defined by the first area 161 is greater than the first length "L2". In one example, the first length "L2" of the first support member 162 may approximately lie in a range of 150 mm and 350 mm.

Further, each support arrangement 124 includes a second support member 164 secured to the first support member 162 and extending substantially perpendicular to the first support member 162. The second support member 164 is embodied as a rectangular plate herein (see FIG. 3). The second support member 164 defines a third end portion 170 and a fourth end portion 172. In some examples, the second support member 164 may include rounded or chamfered edges proximate the third and fourth end portions 170, 172. The second support member 164 defines a second length "L3" such that the first height "H4" defined by the first area 161 is greater than the second length "L3". In one example, the second length "L3" of the second first support member 162 may approximately lie in a range of 150 mm and 350 mm. In one example, the first support member 162 may engage or lock with the second support member 164 to form the support arrangement 124. In some examples, the first and second support members 162, 164 may be welded to each other. In other examples, the support arrangement 124 may include an integral piece defining the first and second support members 162, 164. Further, the first and second support members 162, 164 include a thickness "T2". The thickness "T2" may approximately lie in a range of 1.2 mm to 7 mm. It should be noted that the thickness "T2" of the first and second support members 162, 164 may vary based on the cross-section of the frame member 118 and/or the panel thickness "T1" (see FIG. 5).

Further, in some examples, the first and second support members 162, 164 may be secured to the panel member 116 at any one or all of the quadrants. In the illustrated embodiment, the first and second support members 162, 164 are secured to the respective panels 126, 128 (see FIGS. 2 and 3) of the panel member 116 by welding using 3 mm to 6 mm fillet weld. More particularly, the first and second support members 162, 164 are secured to the respective panels 126, 128 by skip welding as illustrated by weld marks 167. The skip welding may include a weld length between 25 mm and 75 mm and a pitch between 100 mm and 200 mm. In other embodiments, full welding may be used to secure the first and second support members 162, 164 to the respective panels 126, 128.

Figure 5:
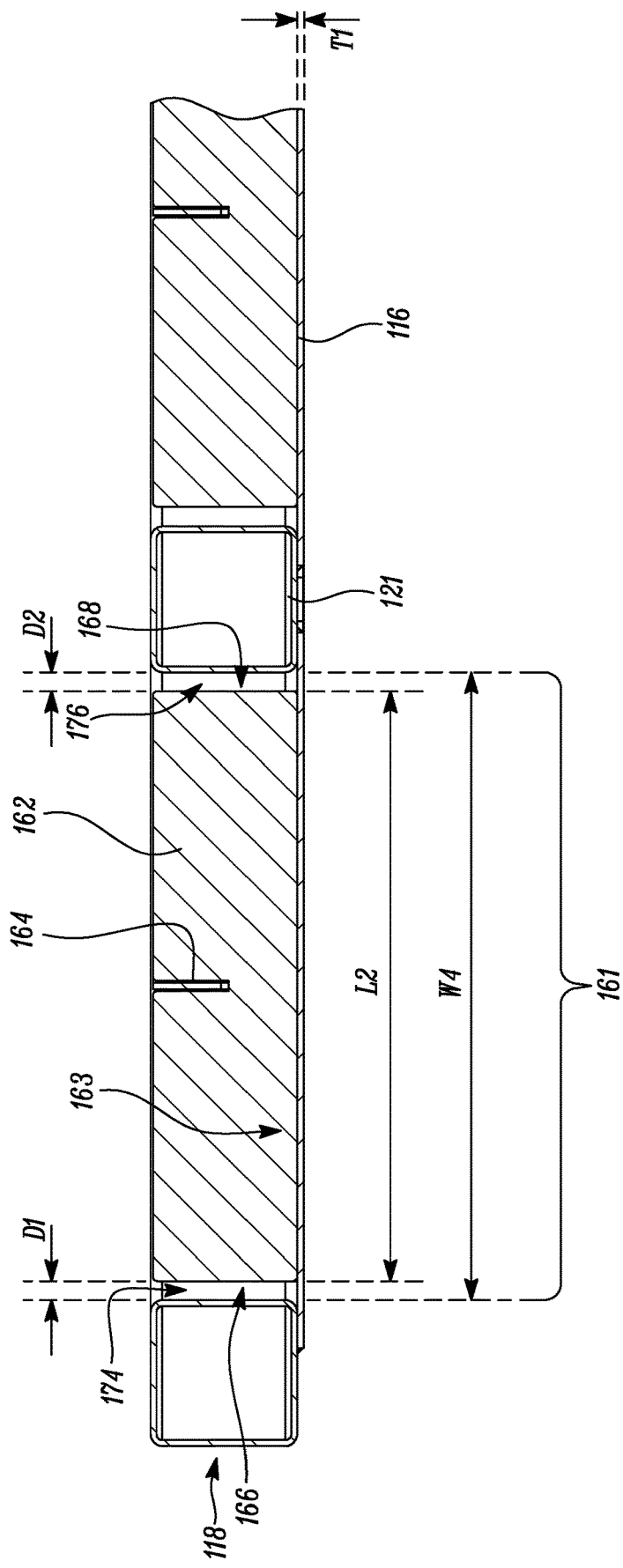
FIG. 5 illustrates a cross-sectional view of the portion of the panel assembly of FIG. 4 generally along line A-A.

Referring now to FIG. 5, a cross-section of the panel assembly 110 generally along line A-A (see FIG. 4) is illustrated. As shown in FIG. 5, as the first length "L2" of the first support member 162 is lesser than the first width "W4" of the first area 161, the first support member 162 is spaced apart from the frame member 118 and the second bar member 121. More particularly, a first gap 174 is defined between the frame member 118 and the first end portion 166 of the first support member 162. The first gap 174 includes a first distance "D1". Moreover, a second gap 176 is defined between the second end portion 168 of the first support member 162 and the second bar member 121. Thus, the first support member 162 is not secured to the frame member 118 and the second bar member 121 and is only secured to the panel member 116. The second gap 176 includes a second distance "D2". The first and second distances "D1", "D2" may approximately lie in a range of 2 mm and 30 mm. In some examples, a maximum value of the first and second distances "D1", "D2" may approximately lie in a range of 22 mm to 30 mm.

Figure 6:
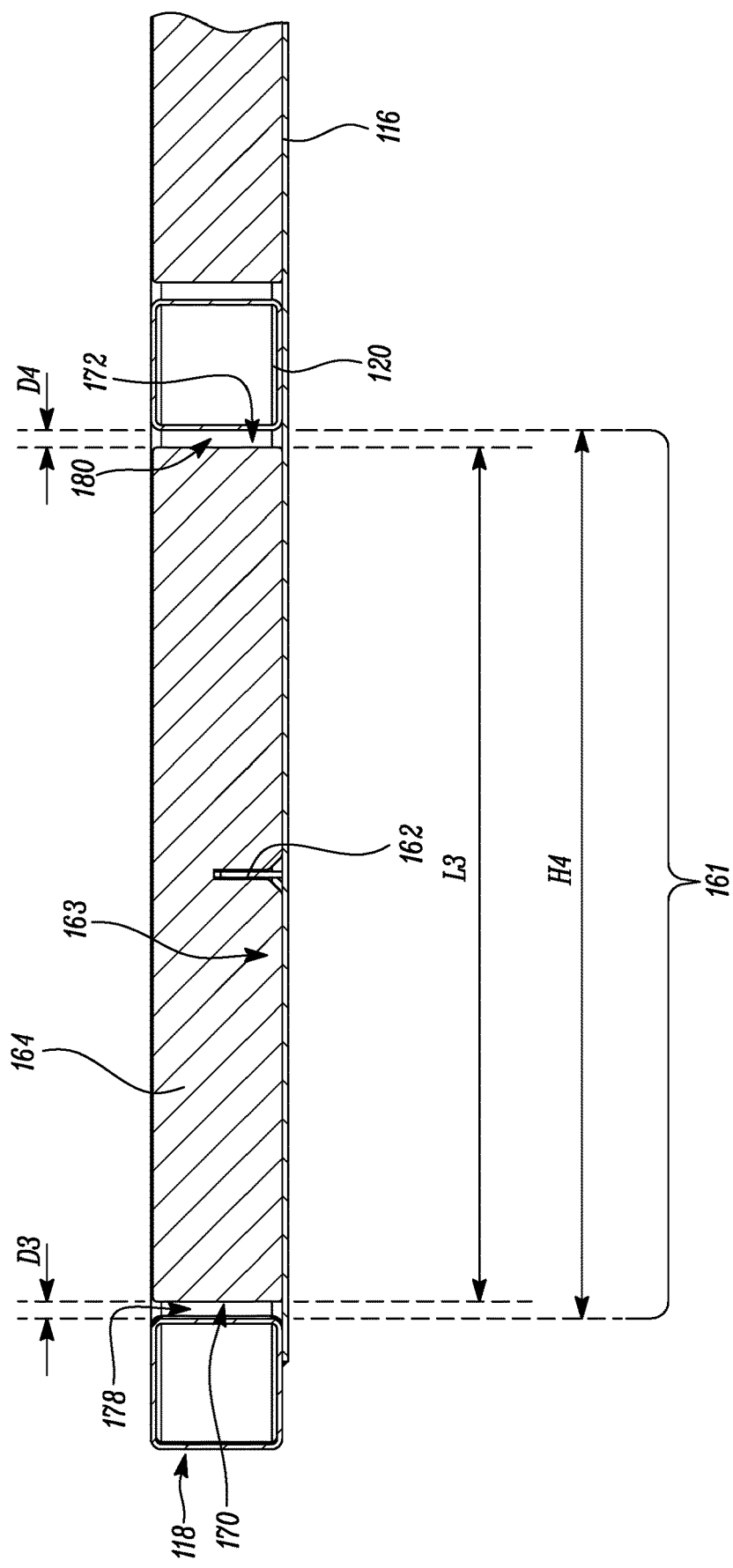
FIG. 6 illustrates a cross sectional view of the portion of the panel assembly of FIG. 4 generally along line B-B.

Referring now to FIG. 6, a cross-section of the panel assembly 110 generally along line B-B (see FIG. 4) is illustrated. As shown in FIG. 6, as the second length "L3" of the second support member 164 is lesser than the first height "H4" of the first area 161, the second support member 164 is spaced apart from the frame member 118 and/or the first bar member 120. More particularly, a third gap 178 is defined between the frame member 118 and the third end portion 170 of the second support member 164. The third gap 178 includes a third distance "D3". Further, a fourth gap 180 is defined between the fourth end portion 172 of the second support member 164 and the first bar member 120. Thus, the second support member 164 is not secured to the frame member 118 and the first bar member 120 and is only secured to the panel member 116. The fourth gap 180 includes a fourth distance "D4". The third and fourth distances "D3", "D4" may approximately lie in a range of 2 mm and 30 mm. In some examples, a maximum value of the third and fourth distances "D3", "D4" may approximately lie in a range of 22 mm to 30 mm.

Referring to FIG. 3, for assembling the panel assembly 110, the frame member 118 is disposed and, in some examples, the frame member 118 may be secured to adjacent panel assemblies 110 by welding. Further, the first bar member 120 and the second bar members 121, 122, 123 may be secured to the frame member 118 by welding. In some examples, the first bar member 120 and the second bar members 121, 122, 123 may be pre-welded to the frame member 118. In such examples, the frame member 118 along with the first bar member 120 and the second bar members 121, 122, 123 may be secured to the adjacent panel assemblies 110 by welding. Further, the panel member 116 is secured to the frame member 118, the first bar member 120, and the second bar members 121, 122, 123 by welding. It should be noted that the support arrangements 124 may be pre-welded to the panel member 116. In other examples, the entire panel assembly 110 may be assembled beforehand and then secured to the adjacent panel assemblies 110 by welding. In alternate embodiments, the entire panel assembly 110 may be pre-welded and secured to adjacent panel assemblies 110 to form the housing 104 (see FIG. 1).

Figure 7:
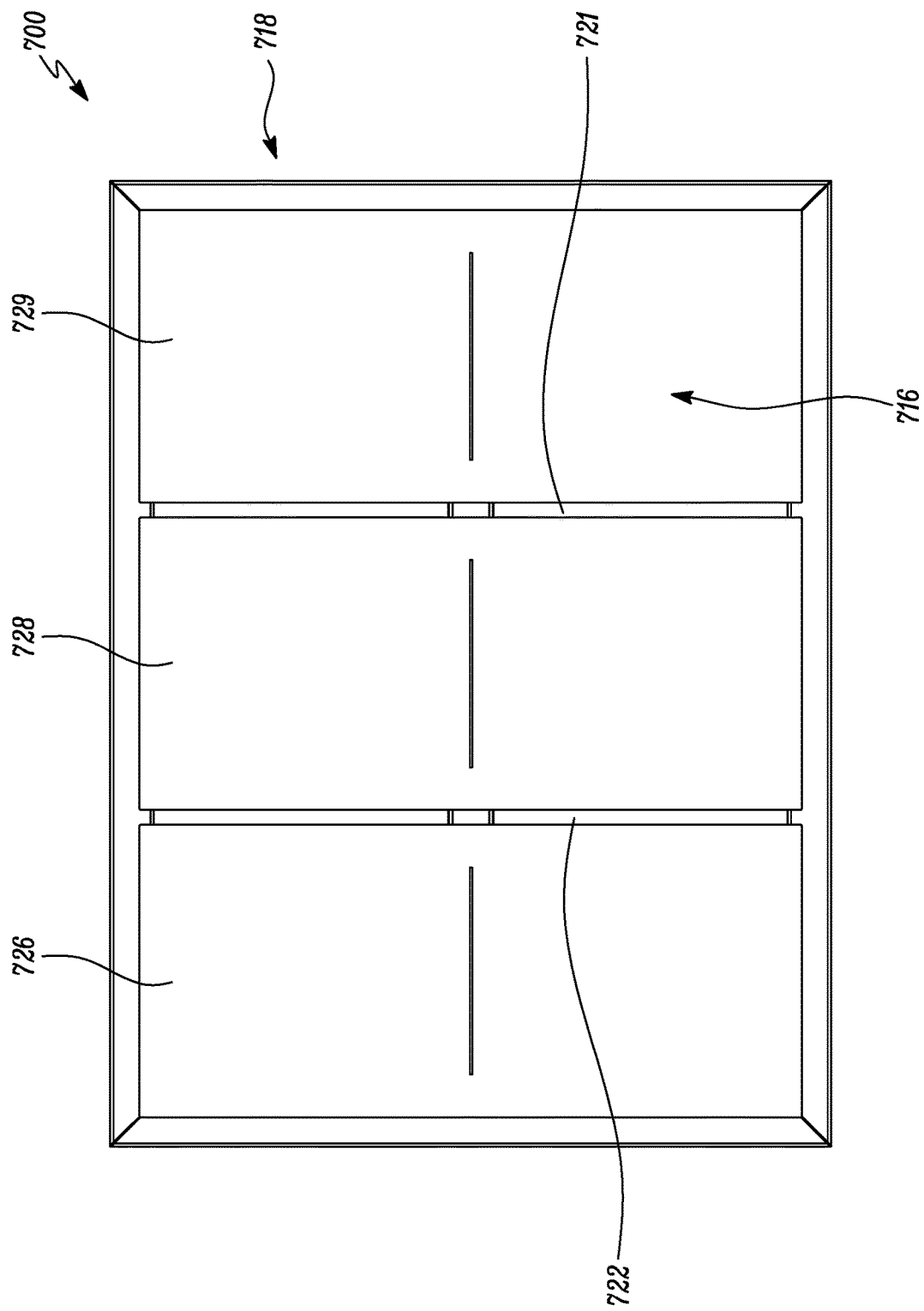
FIGS. 7 and 8 illustrate a panel assembly associated with the aftertreatment assembly of FIG. 1, according to another embodiment of the present disclosure.
Figure 8:
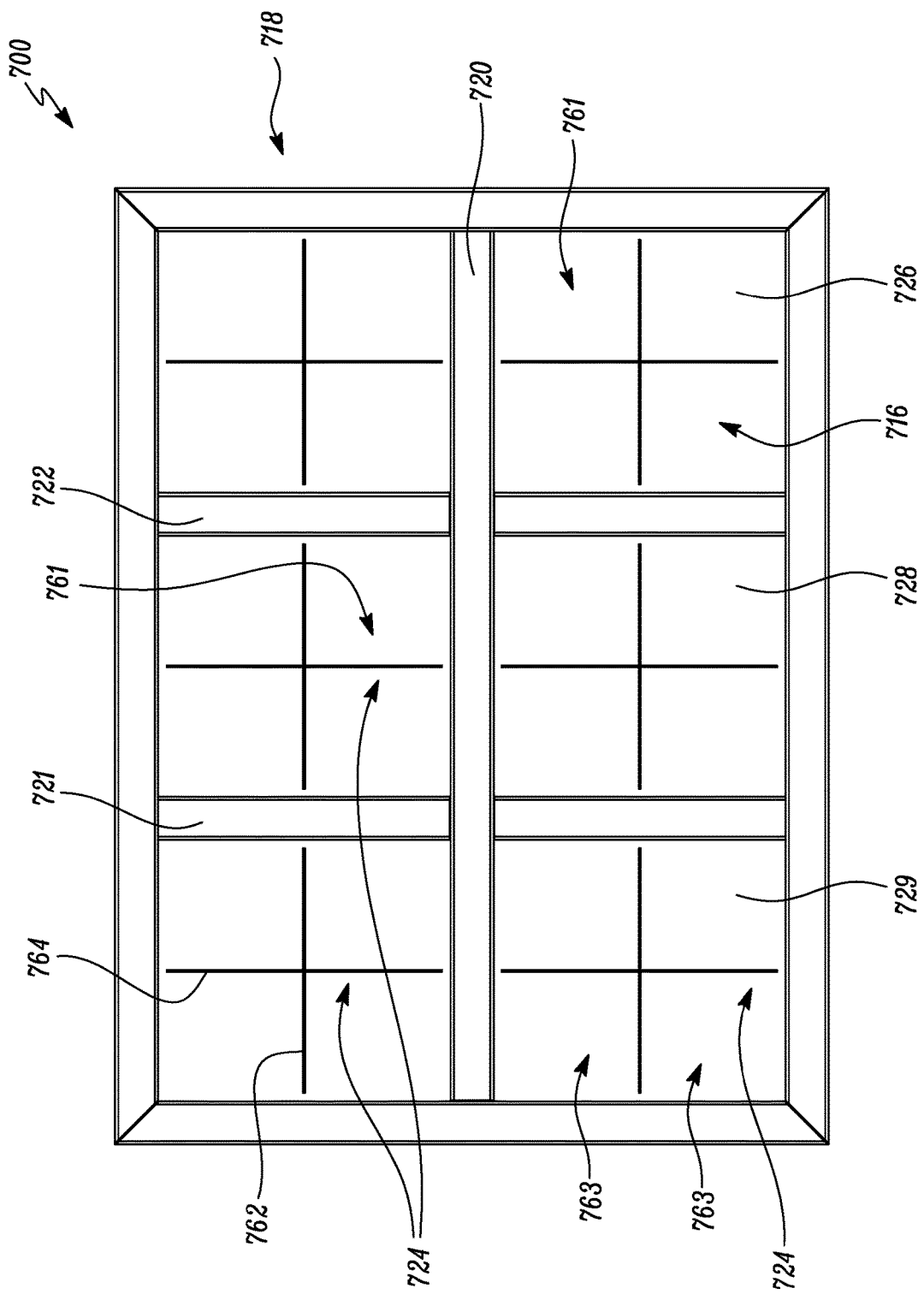

FIGS. 7 and 8 illustrate another embodiment of the present disclosure. As illustrated in FIG. 7, a panel assembly 700 is illustrated. The panel assembly 700 includes a panel member 716. The panel member 716 is similar to the panel member 116 of the panel assembly 110 described in relation to FIG. 2. In the illustrated embodiment, the panel member 716 includes three panels 726, 728, 729 having same dimensions. Each of the three panels 726, 728, 729 is similar to the first and second panels 126, 128 of the panel assembly 110 described in relation to FIG. 2.

Referring to FIG. 8, the panel assembly 700 includes a frame member 718 and a first bar member 720. The frame member 718 and the first bar member 720 are similar to the frame member 118 and the first bar member 120 of the panel assembly 110 described in relation to FIGS. 2 and 3. Moreover, the first bar member 720 may be secured to the respective panels 726, 728, 729 by spot welding or full welding. Further, the panel assembly 700 described herein includes two second bar members 721, 722. Each second bar member 721, 722 is similar to the second bar member 121, 122, 123 of the panel assembly 110 described in relation to FIG. 3. Further, the panel 726 is secured to the frame member 718 and the second bar member 722, the panel 728 is secured to each of the second bar members 721, 722, and the panel 729 is secured to the frame member 718 and the second bar member 721. Moreover, each second bar member 721, 722 is secured to the respective panels 726, 728, 729, the frame member 718, and the first bar member 720 by full welding. Further, details pertaining to various welding connections between the frame member 718, the panel member 716, the first bar member 720, and the second bar members 721, 722 are similar to details pertaining to various welding connections between the frame member 118, the panel member 116, the first bar member 120, and the second bar members 121, 122 of the panel assembly 110 described in relation to FIG. 3.

Further, the first bar member 720 and the second bar members 721, 722 divide the panel member 716 into the first areas 761. In the illustrated embodiment, the panel assembly 700 defines six first areas 761 similar to the first areas 161 of the panel assembly 110 described in relation to FIGS. 3 and 4. The panel assembly 700 also includes a number of support arrangements 724 similar to the support arrangements 124 of the panel assembly 110 described in relation to FIG. 4. The support arrangements 724 are secured to the panel member 716. Moreover, the support arrangements 724 are not secured to the frame member 718, the first bar member 720, and the second bar members 721, 722. Further, each first area 761 is divided into four second areas 763 by the corresponding support arrangement 724. The second areas 763 are similar to the second areas 163 of the panel assembly 110 described in relation to FIG. 4.

Each support arrangement 724 includes a first support member 762 and a second support member 764. A design of the first and second support members 762, 764 is similar to the design of the first and second support members 162, 164 of the panel assembly 110 described in relation to FIG. 4. It should be noted that details pertaining to welding connections between the first and second support members 762, 764 and the panel member 716 are similar to details pertaining to welding connections between the first and second support members 162, 164 and the panel member 116 described in relation to FIG. 4.

Further, design and details pertaining to arrangement of various parts of the panel assembly 700 are similar to design and details pertaining to arrangement of various parts of the panel assembly 110. However, dimensions of the frame member 718, the panel member 716, the first bar member 720, the second bar members 721, 722, the first areas 761, the first support member 762, the second support member 764, and the second areas 763 of the panel assembly 700 may vary as per application requirements.

Figure 9:
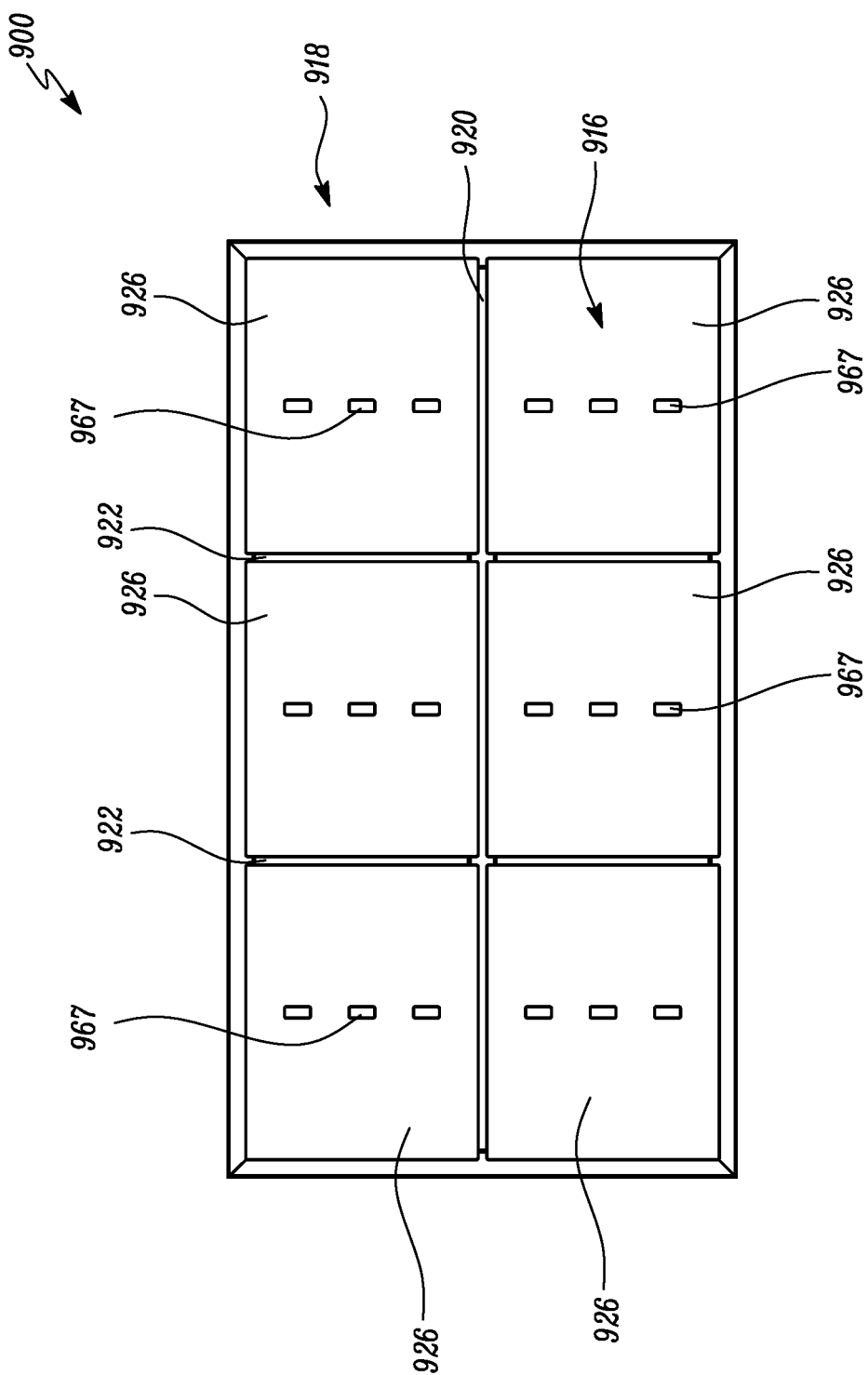
FIGS. 9 and 10 illustrate a panel assembly associated with the aftertreatment assembly of FIG. 1, according to yet another embodiment of the present disclosure.
Figure 10:
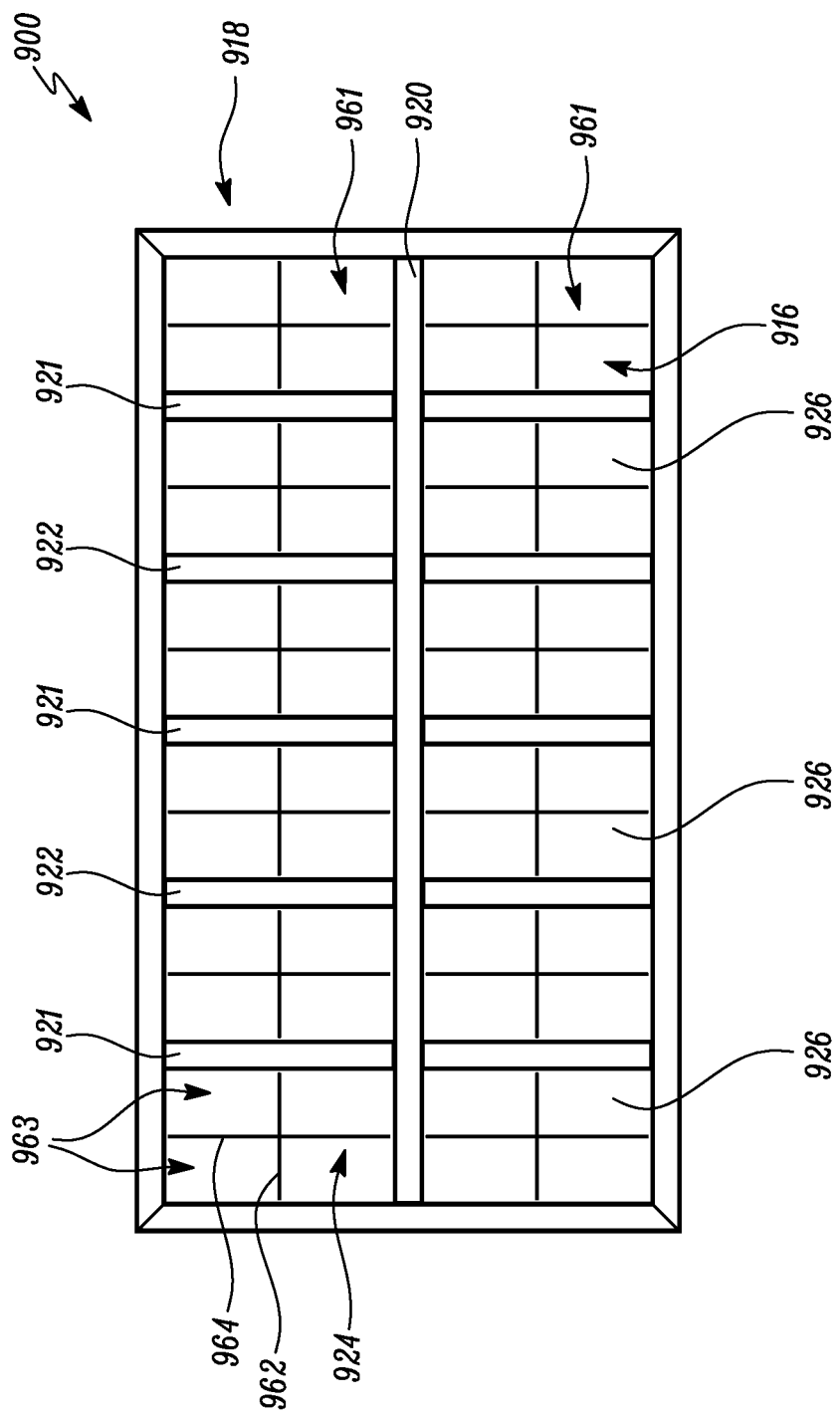

FIGS. 9 and 10 illustrate yet another embodiment of the present disclosure. As illustrated in FIG. 9, a panel assembly 900 is illustrated. The panel assembly 900 includes a panel member 916. The panel member 916 is similar to the panel member 116 of the panel assembly 110 described in relation to FIG. 2. In the illustrated embodiment, the panel member 916 includes six panels 926 having same dimensions. Each of the six panels 926 is similar to the first and second panels 126, 128 of the panel assembly 110 described in relation to FIG. 2.

Referring to FIG. 10, the panel assembly 900 includes a frame member 918 and a first bar member 920. The frame member 918 and the first bar member 920 are similar to the frame member 118 and the first bar member 120 of the panel assembly 110 described in relation to FIGS. 2 and 3. Moreover, the first bar member 920 is secured to the panel member 916 by full welding. Further, the panel assembly 900 described herein includes five second bar members 921, 922. Each second bar member 921, 922 is similar to the second bar member 121, 122, 123 of the panel assembly 110 described in relation to FIG. 3. Further, some panels 926 are secured to the frame member 918 and the second bar member 922 by full welding and some panels 926, that are centrally located, are secured to both the second bar member 922 by full welding. Moreover, each second bar member 921 is secured to the respective panels 926 by spot welding as illustrated by weld marks 967 (shown in FIG. 9). Further, details pertaining to various welding connections between the frame member 918, the panel member 916, the first bar member 920, and the second bar members 921, 922 are similar to details pertaining to various welding connections between the frame member 118, the panel member 116, the first bar member 120, and the second bar members 121, 122, 123 of the panel assembly 110 described in relation to FIG. 3.

Further, the first bar member 920 and the second bar members 921, 922 divide the panel member 916 into the first areas 961. In the illustrated embodiment, the panel assembly 900 defines twelve first areas 961 similar to the first areas 161 of the panel assembly 110 described in relation to FIGS. 3 and 4. The panel assembly 900 also includes a number of support arrangements 924 similar to the support arrangements 124 of the panel assembly 110 described in relation to FIG. 4. The support arrangements 924 are secured to the panel member 916. Moreover, the support arrangements 924 are not secured to the frame member 918, the first bar member 920, and the second bar members 921, 922. Further, each first area 961 is divided into four second areas 963 by the corresponding support arrangement 924. The second areas 963 are similar to the second areas 163 of the panel assembly 110 described in relation to FIG. 4.

Each support arrangement 924 includes a first support member 962 and a second support member 964. A design of the first and second support members 962, 964 is similar to the design of the first and second support members 162, 164 of the panel assembly 110 described in relation to FIG. 4. It should be noted that details pertaining to welding connections between the first and second support members 962, 964 and the panel member 916 are similar to details pertaining to welding connections between the first and second support members 162, 164 and the panel member 116 of the panel assembly 110 described in relation to FIG. 4.

Further, design and details pertaining to arrangement of various parts of the panel assembly 900 is similar to design and details pertaining to arrangement of various parts of the panel assembly 110. However, dimensions of the frame member 918, the panel member 916, the first bar member 920, the second bar members 921, 922, the first areas 961, the first support member 962, the second support member 964, and the second areas 963 of the panel assembly 900 may vary as per application requirements.

INDUSTRIAL APPLICABILITY

The present disclosure relates to various designs of the panel assembly 110, 700, 900. It should be noted that each panel assembly 110, 700, 900 described herein demonstrates a minimum natural frequency of 200 Hertz (Hz). The panel assembly 110, 700, 900 minimizes a system level drop in natural frequency and vibrations due to exhaust gas pressure pulsations. This phenomenon reduces a probability of failure of the panel assembly 110, 700, 900 due to pressure pulsations while the aftertreatment assembly 100 is in operation.

For exemplary purposes, this section will now be explained in relation to the panel assembly 110 explained in relation to FIGS. 2 to 6. However, the details provided below is equally applicable to the panel assembly 700 described in relation to FIGS. 7 and 8 and the panel assembly 900 described in relation to FIGS. 9 and 10. The panel assembly 110 is light in weight and provides improved structural rigidity as compared to conventional panel assemblies. Further, the panel assembly 110 may be assembled from outside of the housing 104 of the aftertreatment system 102 thereby making the assembly process simpler and efficient. Moreover, the design of the panel assembly 110 described herein may not require lab/field structural validation.

Various parts of the panel assembly 110 includes a modular design and have scalable patterns/geometry that allow overlapping of common parts for different configurations of the aftertreatment system 102. The panel assembly 110 described herein is cost effective, easy to manufacture, and allows repeatability in a production environment. Further, the panel assembly 110 may increase manufacturing velocity, reduce production cost, and allow standardization in design owing to the modular design of the panel assembly 110. Moreover, the panel assembly 110 described herein may be retrofitted in existing aftertreatment assemblies due to its modular and adaptable design.

The panel assembly 110 includes the robust tubular built-in frame member 118. Moreover, the frame sections 140, 142, 144, 146 of the frame member 118 are secured to each other by the miter joint 148 using full welding of 3 mm to 6 mm fillet welds. The miter joint 148 provides efficient sealing and restricts exhaust gases to be released into surrounding. Moreover, the panel assembly 110 includes the panels 126, 128 that are fully welded to the frame member 118 or the second bar members 122 around its boundary with 3 to 6 mm fillet welds, to seal exhaust gas from leaking into the surrounding. In some examples, some second bar members 121, 123 may be secured to the panels 126, 128 by spot welding to further increase structural rigidity of the panel assembly 110. It should be noted that the welding connections between various parts of the panel assembly 110 may prevent leakage of the exhaust gas flow towards the surrounding.

Further, the support arrangements 124 include the lightweight support members 162, 164 that are only secured to the panel member 116. It should be noted that the support arrangements 124 are not secured to the frame member 118, the first bar member 120, and the second bar members 121, 122, 123. The light-weight support members 162, 164 eliminate localized pockets of vibrations by introducing damping effect into the panel assembly 110. Further, the panel member 116 is divided into the second areas 163 by the first and second support members 162, 164, thereby allowing the panel assembly 110 to achieve the minimum natural frequency of 200 Hz. More particularly, the first and second areas 161, 163 of the panel assembly 110 reduce an unsupported length of the panel member 116. Further, in some examples, the panel assemblies 110 that form the housing 104 may be connected to each other by structural members that further enhance natural frequency of the housing 104. It should be noted that dimensions of various parts of the panel assembly 110 may be varied based on the configurations/sizes of different aftertreatment systems, or other application requirements, thereby increasing versatility of the panel assembly 110.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A panel assembly comprising:
    a panel member defining a longitudinal axis;
    a frame member secured to the panel member;
    at least one first bar member extending along the longitudinal axis of the panel member, the at least one first bar member being secured to the panel member and the frame member;
    at least one second bar member extending substantially perpendicular to the longitudinal axis of the panel member, the at least one second bar member being secured to the panel member and the frame member, wherein the at least one first bar member and the at least one second bar member divide the panel member into a plurality of first areas defining a first height and a first width; and
    a plurality of support arrangements secured to the panel member, wherein each of the plurality of first areas receive a corresponding support arrangement of the plurality of support arrangements for dividing the first area into a plurality of second areas, and wherein each support arrangement includes:
        a first support member extending along the longitudinal axis of the panel member, the first support member defining a first length such that the first width defined by the first area is greater than the first length; and
        a second support member secured to the first support member and extending substantially perpendicular to the first support member, the second support member defining a second length such that the first height defined by the first area is greater than the second length.

2. The panel assembly of claim 1, wherein the panel member includes one or more panels.

3. The panel assembly of claim 2, wherein each of the one or more panels includes at least one first area.

4. The panel assembly of claim 1, wherein the at least one second bar member includes two or more second bar members.

5. The panel assembly of claim 1, wherein the frame member includes a plurality of frame sections secured to each other, each frame section of the plurality of frame sections being secured to an adjacent frame section of the plurality of frame sections by a miter joint.

6. The panel assembly of claim 1, wherein the frame member, the at least one first bar member, the at least one second bar member, and the plurality of support arrangements are secured to the panel member by welding.

7. The panel assembly of claim 1, wherein each of the at least one first bar member and the at least one second bar member is secured to the frame member by welding.

8. The panel assembly of claim 1, wherein the plurality of support arrangements are not secured to the frame member, the at least one first bar member, and the at least one second bar member.

9. The panel assembly of claim 1, wherein each of the plurality of second areas includes four second areas.

10. The panel assembly of claim 1, wherein the panel assembly is made of stainless steel.

11. The panel assembly of claim 1, wherein a plurality of panel assemblies are arranged to form a housing for receiving an aftertreatment system.

12. An aftertreatment assembly comprising:
    an aftertreatment system; and
    a housing for receiving the aftertreatment system, wherein the housing includes a plurality of panel assemblies arranged to define a hollow space for receiving the aftertreatment system, wherein each panel assembly includes:
        a panel member defining a longitudinal axis;
        a frame member secured to the panel member;
        at least one first bar member extending along the longitudinal axis of the panel member, the at least one first bar member being secured to the panel member and the frame member;
        at least one second bar member extending substantially perpendicular to the longitudinal axis of the panel member, the at least one second bar member being secured to the panel member and the frame member, wherein the at least one first bar member and the at least one second bar member divide the panel member into a plurality of first areas defining a first height and a first width; and
        a plurality of support arrangements secured to the panel member, wherein each of the plurality of first areas receive a corresponding support arrangement of the plurality of support arrangements for dividing the first area into a plurality of second areas, and wherein each support arrangement includes:
            a first support member extending along the longitudinal axis of the panel member, the first support member defining a first length such that the first width defined by the first area is greater than the first length; and
            a second support member secured to the first support member and extending substantially perpendicular to the first support member, the second support member defining a second length such that the first height defined by the first area is greater than the second length.

13. The aftertreatment assembly of claim 12, wherein the panel member includes one or more panels.

14. The aftertreatment assembly of claim 13, wherein each of the one or more panels includes at least one first area.

15. The aftertreatment assembly of claim 12, wherein the frame member includes a plurality of frame sections secured to each other, each frame section of the plurality of frame sections being secured to an adjacent frame section of the plurality of frame sections by a miter joint.

16. The aftertreatment assembly of claim 12, wherein the frame member, the at least one first bar member, the at least one second bar member, and the plurality of support arrangements are secured to the panel member by welding.

17. The aftertreatment assembly of claim 12, wherein each of the at least one first bar member and the at least one second bar member is secured to the frame member by welding.

18. The aftertreatment assembly of claim 12, wherein the plurality of support arrangements are not secured to the frame member, the at least one first bar member, and the at least one second bar member.

19. The aftertreatment assembly of claim 12, wherein each of the plurality of second areas includes four second areas.

20. The aftertreatment assembly of claim 12, wherein the panel assembly is made of stainless steel.

\* \* \* \* \*